(12) United States Patent
Lignee et al.

(10) Patent No.: US 12,386,408 B2
(45) Date of Patent: Aug. 12, 2025

(54) SENSOR AND ASSOCIATED METHOD

(71) Applicant: Aktiebolaget SKF, Gothenburg (SE)

(72) Inventors: Nicolas Lignee, La Membrolle sur Choisille (FR); Clément Poulailleau, Amboise (FR); Simon Hubert, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 61 days.

(21) Appl. No.: 18/418,914

(22) Filed: Jan. 22, 2024

(65) Prior Publication Data

US 2024/0264656 A1    Aug. 8, 2024

(30) Foreign Application Priority Data

Feb. 3, 2023 (DE) .......................... 102023200896.3

(51) Int. Cl.
  *G06F 1/3228* (2019.01)
  *G06F 9/48* (2006.01)
(52) U.S. Cl.
  CPC ............ *G06F 1/3228* (2013.01); *G06F 9/485* (2013.01)

(58) Field of Classification Search
  CPC .............................. G06F 1/3228; G06F 9/485
  See application file for complete search history.

(56) References Cited

U.S. PATENT DOCUMENTS

| | | | | |
|---|---|---|---|---|
| 10,104,615 B2 * | 10/2018 | Irony | ..................... | H04W 76/10 |
| 2003/0173983 A1 * | 9/2003 | Ansari | ................... | G01D 5/165 |
| | | | | 324/691 |
| 2016/0224398 A1 * | 8/2016 | Palmer | .................... | G06F 9/542 |

* cited by examiner

*Primary Examiner* — Terrell S Johnson
(74) *Attorney, Agent, or Firm* — Stinson LLP

(57) ABSTRACT

A sensor (8) includes a plurality of modules (11, 12). Each module performs a task. The sensor (8) includes a control means (10) that (1) reads a word (WO) having a plurality of bits, with each bit being associated to the state of execution of the task performed by a module when the sensor (8) is in an active mode, and (2) switches the sensor (8) into a sleep mode when each bit (B1, B2) is in a first predetermined state. The first predetermined state of each bit is representative of the none execution of the task of the module associated to the bit.

16 Claims, 3 Drawing Sheets

SENSOR AND ASSOCIATED METHOD

CROSS-REFERENCE TO RELATED APPLICATION

This application claims priority to German Application No. 102023200896.3, filed Feb. 3, 2023, the entirety of which is hereby incorporated by reference.

FIELD

The present disclosure is directed to a sensor and a method for putting such a sensor in a sleep mode.

More particularly, the present disclosure deals with putting such a sensor in a sleep mode when modules of the sensor are not performing a task.

BACKGROUND

Generally, a wireless sensor is supplied by a battery to facilitate the implementation of the wireless sensor.

In some embodiments of the wireless sensor, the battery of the said sensor may not be replaced, the battery being sealed in the said sensor so that the lifetime of the wireless sensor depends on the duration of the battery.

To enhance the duration of the battery, it is known to put the sensor in a sleep mode when the sensor is not solicited to perform a task for example communicating with a gateway connected to the sensor to send measurement values.

However, in order to enhance the duration of the battery, the sensor should be put in the sleep mode as soon as any task is performed by the sensor, and in order to deliver reliable measurement values, the sensor should be put in the sleep mode when each algorithm of the module of the sensor is not performed or the execution of each algorithm is finished.

Consequently, the present disclosure intends to determine the optimal time to put the sensor in a sleep mode in order to optimize the duration of the battery and also in order to avoid to interrupt the execution of at least one module performed by the sensor.

SUMMARY

According to an aspect a method for putting a sensor in sleep mode is proposed.

The sensor comprises a plurality of modules, each module being configured to perform a task.

The method comprises:
reading a word comprising a plurality of bits, each bit being associated to the state of execution of the task performed by a module when the sensor is in an active mode, and
switching the sensor in the sleep mode when each bit is in a first predetermined state, the first predetermined state of each bit being representative of the none execution of the task associated to the said bit.

The reading of the state of each bit of the word permits to easily and quickly determine if the sensor may be switch in the sleep mode without interrupting the execution of at least one module in order to optimize the time of switching the sensor in the sleep mode to reduce the power consumption of the sensor.

Preferably, when at least one bit of the word is not in the first predetermined state associated to the said bit, the method comprises preventing to switch the sensor in the sleep mode to keep the sensor in the active mode.

Advantageously, the method further comprises setting the bit associated to the state of execution of a task in a second predetermined state different from the first predetermined state when the said task is performed.

Preferably, the method comprises setting the bit associated to the state of execution of a task in the first predetermined state when the said task is not performed or when the execution of the task is finished.

According to another aspect, a sensor is proposed.

The sensor comprises:
a plurality of modules, each module being configured to perform a task, and control means configured:
to read a word comprising a plurality of bits, each bit being associated to the state of execution of the task performed by a module when the sensor is in an active mode, and
to switch the sensor in a sleep mode when each bit is in a first predetermined state, the first predetermined state of each bit being representative of the none execution of the task of the module associated to the said bit.

Advantageously, the sensor further comprises first configuring means configured to set the bit associated to the state of execution of a task in a second predetermined state different from the first predetermined state when the said task is performed.

Preferably, the sensor further comprises second configuring means configured to set the bit associated to the state of execution of a task in the first predetermined state when the said task is not performed or when the execution of the task is finished.

Advantageously, the sensor further comprises sensing means, one module of the plurality of modules being configured to condition measurements delivered by the sensing means.

Preferably, the sensing means are configured to measure vibrations.

Advantageously, the sensor comprises a sealed battery.

BRIEF DESCRIPTION OF THE DRAWINGS

Other advantages and features of the present disclosure will appear on examination of the detailed description of embodiments, in no way restrictive, and the appended drawings in which.

DETAILED DESCRIPTION

Figure 1:
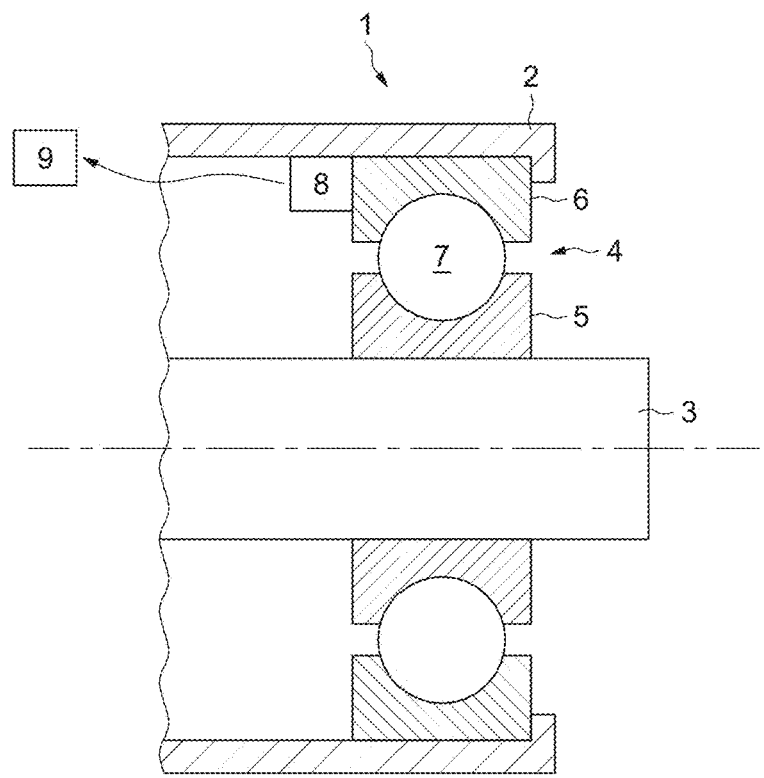
FIG. 1 illustrates schematically a machine according to the present disclosure.

Reference is made to FIG. 1 which represents schematically a partial longitudinal cross section of a machine 1.

The machine 1 comprises a housing 2 and a shaft 3 supported in the housing 2 by a roller bearing 4.

The roller bearing 4 is provided with an inner ring 5 mounted on the shaft 3, and with an outer ring 6 mounted into the bore of the housing 2. The outer ring 6 radially surrounds the inner ring 5. The inner and outer rings 5, 6 rotate concentrically relative to one another.

The roller bearing 4 is further provided with a row of rolling elements 7 radially interposed between inner and outer raceways of the inner and outer rings 5, 6. In the illustrated example, the rolling elements 7 are balls. Alternatively, the roller bearing may comprise other types of rolling elements 7, for example rollers. In the illustrated example, the roller bearing comprise one row of rolling elements 7. Alternatively, the roller bearing comprise may comprise several rows of rolling elements.

A sensor 8 is mounted in a bore of the housing 2 and comes axially into contact against a frontal face of the outer ring 6 to measure a physical parameter, for example vibrations on the outer ring 6.

In variant, the sensor 8 may be interposed between the bore of the housing 2 and the outer ring 6.

The sensor 8 may be mounted on a bore of the housing 2.

In variant, the sensor 8 may be mounted on the inner ring 5.

In another preferred embodiment, the sensor 8 is mounted on an external portion of the housing 2 and doesn't come into direct contact with any part of the bearing 4.

In variant, the sensor 8 may measure another physical parameter, for example the temperature in the housing 2.

The sensor 8 is able to communicate with a gateway 9 to transmit the measured values to a network (not represented) for further processing.

The gateway 9 is located outside the housing 2.

In variant, the gateway 9 may be located inside the housing 2.

Figure 2:
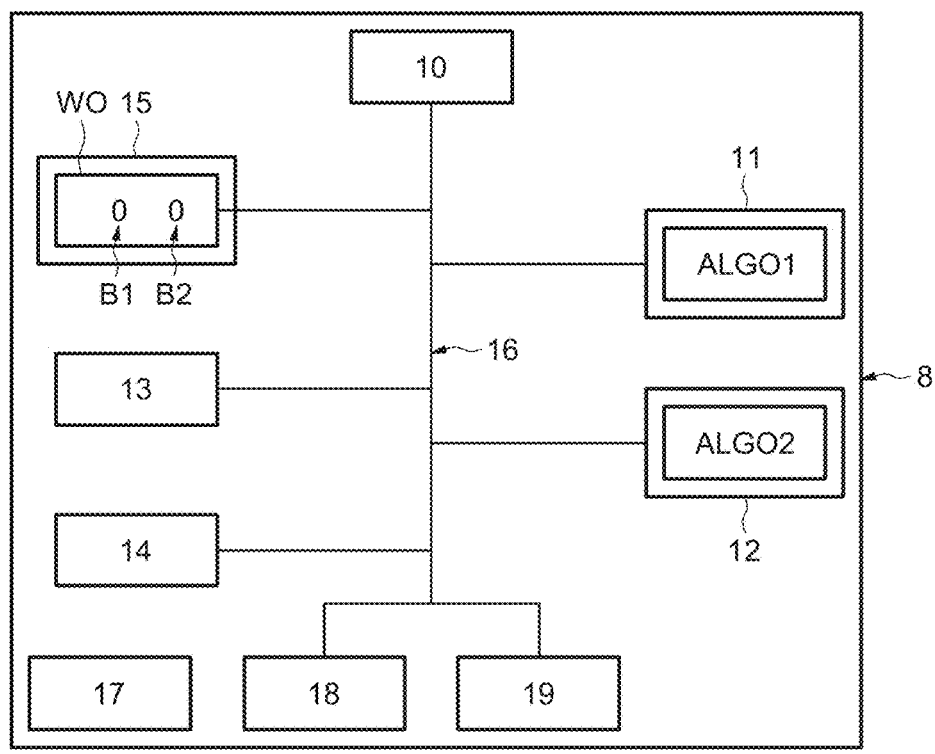
FIG. 2 illustrates schematically a sensor according to the present disclosure.

FIG. 2 illustrates schematically an embodiment of the sensor 8.

The sensor 8 comprises control means 10, a plurality of modules 11, 12, first configuring means 13, second configuring means 14, and a memory 15.

The sensor 8 further comprises a bus 16 connecting the plurality of modules 11, 12, the first configuring means 13, the second configuring means 14, and the memory 15 to the control means 10.

The control means 10 may comprise a processing unit implementing the modules 11, 12, the first configuring means 13, the second configuring means 14, and the memory 15.

The sensor 8 may further comprise a battery 17.

The battery 17 may be sealed in the sensor 8 so that the battery 17 is not interchangeable.

For clarity reason, the sensor 8 comprises two modules 11, 12.

The sensor 8 may comprise only one module or more than two modules.

Each module 11, 12 implemented by the control means 10 is intended to perform a task.

A first module 11 comprises for example a first algorithm ALGO1 and the second module 12 comprises for example a second algorithm ALGO2.

The first algorithm ALGO1 run by the control means 10 performs a first task, and the second algorithm ALGO2 run by the control means 10 performs a second task.

For example, the first algorithm ALGO1 controls sensing means 18 connected to the bus 16.

The sensing means 18 measure the vibrations on the outer ring 6.

The first module 11 is intended to condition vibration measurements delivered by the sensing means 18.

For example, the second algorithm ALGO2 controls a communication interface 19 connected to the bus 16.

The communication interface 19 is for example a universal serial bus (USB) interface or a wireless interface using for example a Bluetooth protocol.

The memory 15 saves a word WO comprising a plurality of bits, each bit being associated to the state of execution of a task associated to a different module 11, 12.

In this case, the word WO comprise a first bit B1 associated to the state of execution of the first algorithm ALGO1 and a second bit B2 associated to the state of execution of the second algorithm ALGO2.

When the first algorithm ALGO1 is not performed by the control means 10 or the execution of the first algorithm ALGO1 is finished, the task associated to the first algorithm ALGO1 is not performed.

The first bit B1 associated to the none execution of the task associated to the first algorithm ALGO1 is in a first predetermined state.

Similarly, when the second algorithm ALGO2 is not performed by the control means 10 or the execution of the second algorithm ALGO2 is finished, the task associated to the second algorithm ALGO2 is not performed.

The second bit B2 associated to the none execution of the task associated to the second algorithm ALGO2 is in the first predetermined state.

When the first algorithm ALGO1 is performed by the control means 10, the task associated to the first algorithm ALGO1 is performed.

The first bit B1 associated to the execution of the task associated to the first algorithm ALGO1 is in a second predetermined state.

Similarly, when the second algorithm ALGO2 is performed by the control means 10 the task associated to the second algorithm ALGO2 is performed.

The second bit B2 associated to the execution of the task associated to the second algorithm ALGO2 is in the second predetermined state.

A task is performed when the module 11, 12 associated to the said task is fetched by the control means 10 to be run by the said means.

The first predetermined state may be a logic low state "0" and the second predetermined state may be a logic high state "1".

It is assumed that the first and second bits B1, B2 are in the logic low state "0".

It is assumed that the sensor 8 is in an active mode.

In the active mode, the sensing means 18 are able to take measurements and the communication interface 19 is able to transfer data between the bus 16 and the gateway 9.

In the sleep mode, the sensing means 18 and the communication interface 19 are not supplied by the battery 17 to reduce the power consumption of the sensor 8 to enhance the duration of the battery 17.

Figure 3:
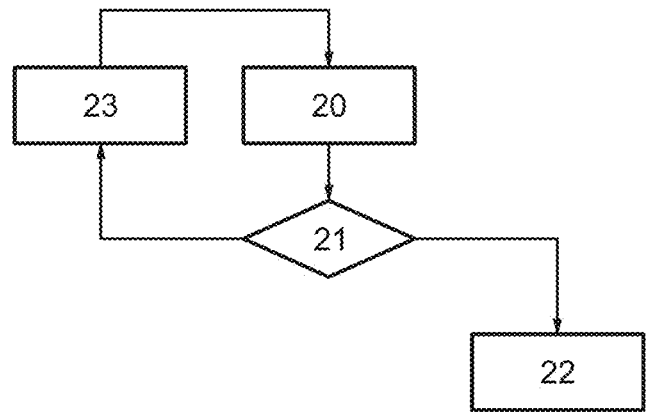
FIG. 3 illustrates schematically an example of a method for putting the sensor in the sleep mode according to the present disclosure.

FIG. 3 illustrates an example of a method for putting the sensor 8 in the sleep mode.

In a step 20, the control means 10 read the word WO stored in the memory 15.

If each bit B1, B2 of the word WO is in the first predetermined state (step 21), in step 22, the control means 10 switches the sensor in the sleep mode.

If at least one bit B1, B2 of the word WO is not in the first predetermined state e.g., at least one bit B1, B2 of the word is in the second predetermined state, in step 23, the control means 10 prevent to switch the sensor 8 in the sleep mode to keep the sensor in the active mode.

The control means 10 repeat step 20 regularly. The duration between two repetitions of step 20 is determined according to the type of sensor 8.

Step 20 and may for example repeated every 10 ms.

Figure 4:
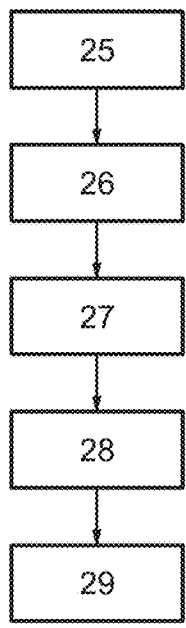
FIGS. 4, 5 and 6 illustrate schematically an example of execution of a task of a module according to the present disclosure.
Figure 5:
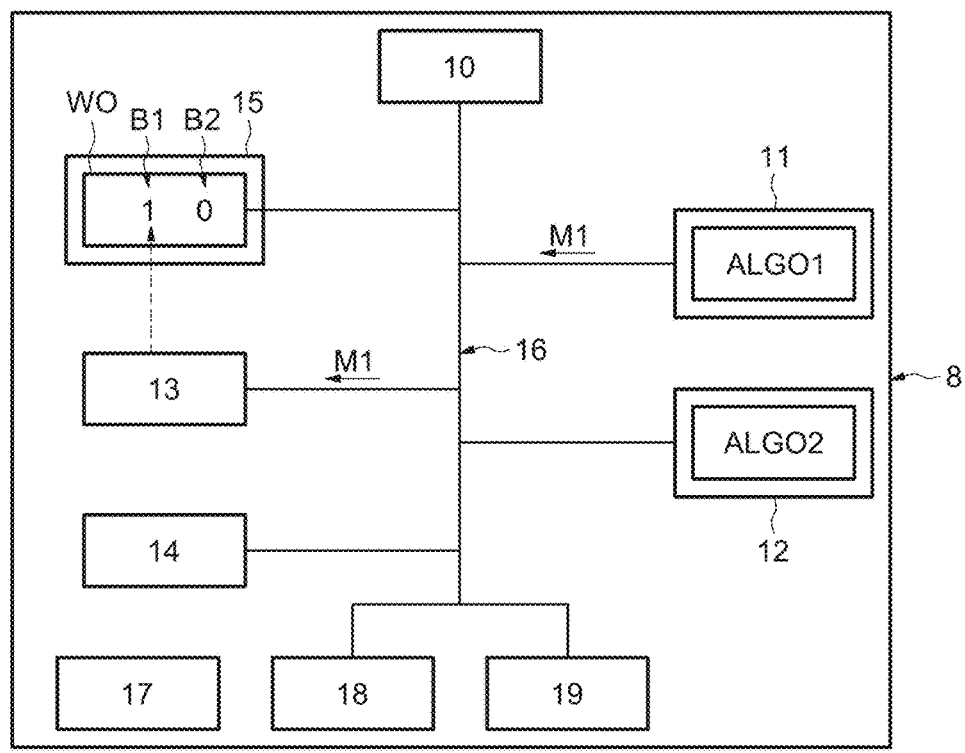
Figure 6:
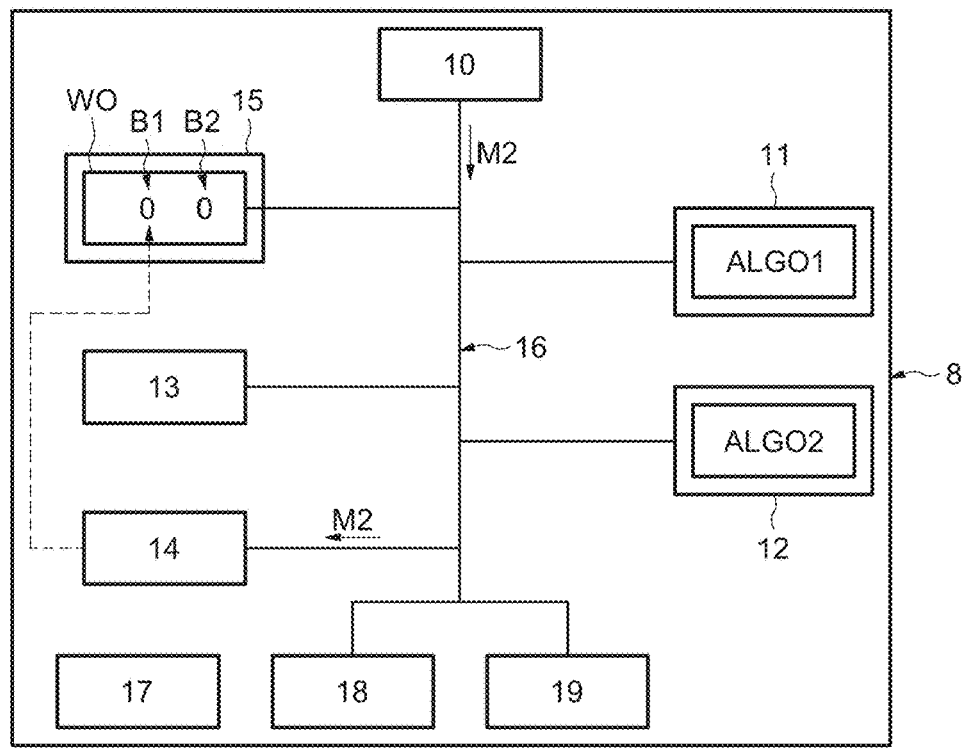

FIGS. 4, 5, and 6 illustrate an example of execution of the task of the first module 11.

In a step 25, the control means 10 fetch the first module 11.

The task associated to the first module 11 is performed, the first module 11 delivers a first message M1 on the bus 16 representative of the performing of the said task.

In step 26, at the reception of the first message M1, the first configuring means 13 set the first bit B1 is the second predetermined state (FIG. 5).

As the first bit B1 of the word WO is in the second predetermined state, the control means 10 prevent to switch the sensor 8 in the sleep mode to keep the sensor in the active mode (step 23).

In step 27, the control means 10 run the first module 11.

The steps 26 and 27 may be executed sequentially when the execution of the task of the first module 11 by the control means 10 is for example in a waiting queue or simultaneously.

In step 28, when the control means 10 have finished to run the first module 11, the control means 10 deliver a second message M2 on the bus 16 representative of the end of the running of the first module 11 (FIG. 6).

In step 29, at the reception of the second message M2, the second configuring means 14 set the first bit B1 in the first predetermined state.

Each bit B1, B2 of the word WO is in the first predetermined state so that the next time step 20 is run, the control means send the sensor in the sleep mode.

The state of each bit of the word WO permits to easily and quickly determine if the sensor 8 may be switch in the sleep mode without interrupting the execution of at least one module 11, 12.

As the state of each bit is quickly changed by the first and second configuring means 13, 14, the switching time of the sensor 8 in the sleep mode is optimized permitting to reduce the power consumption of the sensor 8 and extending the duration of the battery 17.

What is claimed is:

1. A method for putting a sensor in sleep mode, the sensor comprising a plurality of modules, each module being configured to perform a task, the method comprising:
reading a word comprising a plurality of bits, each bit being associated to the state of execution of the task performed by a module when the sensor is in an active mode, and
switching the sensor in the sleep mode when each bit is in a first predetermined state, the first predetermined state of each bit being representative of the none execution of the task associated to the said bit.

2. The method according to claim 1, wherein when at least one bit of the word is not in the first predetermined state associated to the said bit, the method comprises preventing to switch the sensor in the sleep mode.

3. The method according to claim 1, further comprising setting the bit associated to the state of execution of a task in a second predetermined state different from the first predetermined state when the said task is performed.

4. The method according to claim 1, further comprising setting the bit associated to the state of execution of a task in the first predetermined state when the said task is not performed or when the execution of the task is finished.

5. The method according to claim 2, further comprising setting the bit associated to the state of execution of a task in a second predetermined state different from the first predetermined state when the said task is performed.

6. The method according to claim 5, further comprising setting the bit associated to the state of execution of a task in the first predetermined state when the said task is not performed or when the execution of the task is finished.

7. A sensor comprising:
a plurality of modules, each module being configured to perform a task, and
a control means configured:
to read a word comprising a plurality of bits, each bit being associated to the state of execution of the task performed by a module when the sensor is in an active mode, and
to switch the sensor in a sleep mode when each bit is in a first predetermined state, the first predetermined state of each bit being representative of the none execution of the task of the module associated to the said bit.

8. The sensor according to claim 7, further comprising first configuring means configured to set the bit associated to the state of execution of a task in a second predetermined state different from the first predetermined state when the said task is performed.

9. The sensor according to claim 7, further comprising second configuring means configured to set the bit associated to the state of execution of a task in the first predetermined state when the said task is not performed or when the execution of the task is finished.

10. The sensor according to claim 7, further comprising sensing means, one module of the plurality of modules being configured to condition measurements delivered by the sensing means.

11. The sensor according to claim 10, wherein the sensing means is configured to measure vibrations.

12. The sensor according to claim 7, wherein the sensor comprises a sealed battery.

13. The sensor according to claim 8, further comprising second configuring means configured to set the bit associated to the state of execution of a task in the first predetermined state when the said task is not performed or when the execution of the task is finished.

14. The sensor according to claim 13, further comprising sensing means, one module of the plurality of modules being configured to condition measurements delivered by the sensing means.

15. The sensor according to claim 14, wherein the sensing means is configured to measure vibrations.

16. The sensor according to claim 15, wherein the sensor comprises a sealed battery.

* * * * *